(12) United States Patent
Roessig et al.

(10) Patent No.: US 11,081,272 B2
(45) Date of Patent: Aug. 3, 2021

(54) DEVICE SUPPORT ASSEMBLY

(71) Applicant: ABB Power Grids Switzerland AG, Baden (CH)

(72) Inventors: Andreas Roessig, Bad Honnef (DE); Ewald-Peter Scholl, St. Katharinen (DE); Thomas Schmidt, Erpel (DE)

(73) Assignee: ABB Power Grids Switzerland AG, Baden (CH)

( * ) Notice: Subject to any disclaimer, the term of this patent is extended or adjusted under 35 U.S.C. 154(b) by 145 days.

(21) Appl. No.: 15/903,067

(22) Filed: Feb. 23, 2018

(65) Prior Publication Data
US 2018/0247752 A1 Aug. 30, 2018

(30) Foreign Application Priority Data
Feb. 24, 2017 (DE) ...................... 10 2017 103 927.9

(51) Int. Cl.
| | | |
|---|---|---|
| *H01F 27/06* | (2006.01) | |
| *H01F 27/00* | (2006.01) | |
| *B60P 1/02* | (2006.01) | |
| *F16F 15/02* | (2006.01) | |
| *F16M 5/00* | (2006.01) | |

(52) U.S. Cl.
CPC ................. *H01F 27/06* (2013.01); *B60P 1/02* (2013.01); *F16F 15/02* (2013.01); *F16M 5/00* (2013.01); *H01F 27/002* (2013.01)

(58) Field of Classification Search
CPC ......... H01F 27/002; H01F 27/06; F16M 5/00; F16F 15/02; B60P 1/02
See application file for complete search history.

(56) References Cited

U.S. PATENT DOCUMENTS

| | | | | |
|---|---|---|---|---|
| 3,377,601 A | * | 4/1968 | Donegan ............... | H01F 27/002 336/65 |
| 3,841,032 A | * | 10/1974 | Grannis, III .............. | E02D 5/80 336/65 |
| 4,505,449 A | * | 3/1985 | Turner ..................... | F16M 5/00 248/346.03 |
| 10,468,173 B2 | | 11/2019 | Gaber | |

(Continued)

FOREIGN PATENT DOCUMENTS

| | | |
|---|---|---|
| CA | 1211828 A | 9/1986 |
| CH | 657944 A5 | 9/1986 |

(Continued)

OTHER PUBLICATIONS

German Search Reported dated Feb. 15, 2018 for German Patent Application No. 10 2017 103 927.9, 18 pages (including English translation).

(Continued)

*Primary Examiner* — Saul Rodriguez
*Assistant Examiner* — Ashley K Romano
(74) *Attorney, Agent, or Firm* — Sage Patent Group

(57) ABSTRACT

A device support assembly for an electrical device, in particular a transformer or a power transformer, includes: a plurality of retaining units arranged on the device itself; and a support arrangement which has a plurality of load stabilizers. The electrical device is set down on the load stabilizers by the retaining units in an end position and/or rests and is arranged between the load stabilizers, at least in portions, after being set down.

15 Claims, 3 Drawing Sheets

(56) References Cited

U.S. PATENT DOCUMENTS

| | | | |
|---|---|---|---|
| 2014/0003896 A1* | 1/2014 | Huet | B60P 1/02 |
| | | | 414/540 |
| 2015/0246631 A1* | 9/2015 | Konchan | B60P 1/6445 |
| | | | 414/497 |
| 2016/0116017 A1* | 4/2016 | Ebihara | F16M 11/12 |
| | | | 248/550 |
| 2016/0138263 A1* | 5/2016 | Koyama | F16F 15/02 |
| | | | 52/167.1 |
| 2016/0275440 A1* | 9/2016 | Vladimirov | G06Q 10/083 |
| 2017/0349418 A1* | 12/2017 | Schmalzl | B66F 9/07504 |
| 2018/0044835 A1* | 2/2018 | Baron | D06F 37/22 |
| 2018/0050629 A1* | 2/2018 | Reddy Asani | B60P 7/135 |
| 2018/0073241 A1* | 3/2018 | Lomax | F16B 9/026 |

FOREIGN PATENT DOCUMENTS

| | | | | |
|---|---|---|---|---|
| DE | 102010012408 A1 | 9/2011 | | |
| DE | 2020130002851 | * | 7/2013 | H01F 41/00 |
| EP | 0372220 A1 | 6/1990 | | |
| EP | 1300548 A2 | 4/2003 | | |
| EP | 2955729 A1 | 12/2015 | | |
| JP | 07192916 A | * | 7/1995 | H01F 27/002 |

OTHER PUBLICATIONS

Extended European Search Report dated Aug. 17, 2018 for European Patent Application No. 18157829.5, 22 pages.

* cited by examiner

DEVICE SUPPORT ASSEMBLY

CROSS-REFERENCE TO PRIOR APPLICATION

Priority is claimed to German Patent Application No. DE 10 2017 103 927.9, filed on Feb. 24, 2017, the entire disclosure of which is hereby incorporated by reference herein.

FIELD

The invention relates to a device support assembly for electrical devices, in particular for transformers or power transformers, high-voltage power transformers, reactors, phase-shifting power transformers and mobile resiliency transformers.

BACKGROUND

Mobile transformers are currently being increasingly used because of their many possible uses. They are mobile, rather than bound to one particular operating location, such that they can very quickly replace a transformer which is not fully operational, or which is damaged.

A transformer which is not fully operational and which may have reduced performance values represents a serious problem, as repairing said transformer can easily take several weeks or months, or even up to a year, the risk of a total failure increasing constantly during this time. In this case, failure of the transformer could result in significant damage and ultimately also in a production outage of the relevant supply network and failure of the equipment connected thereto.

In this case, it is also of fundamental importance to the reliability and stability of a power and/or supply network to be able to quickly exchange a transformer of this kind.

However, the actual process of exchanging a defective transformer of this kind requires a relatively large technical outlay and involves the stages of removing and/or taking away the old transformer and transporting or delivering the new transformer to the relevant operating location using a suitable means of transport, for example an appropriately designed low bed trailer.

The transformer must then be unloaded from the means of transport in question and arranged and installed at the relevant operating location on a fixed foundation specifically designed for this purpose. Completion of this stage requires the use of at least one mobile heavy lift crane because of the high dead weight of the transformer in question. A crane of this kind is relatively large and designed to lift and/or move the load of the transformer in question. Furthermore, these cranes are often available to be booked only for a very short period of time. Moreover, due to their size and weight, they can in general travel only on particular routes and roads, and this may mean that they are not always available at the operating location at the right time, which can further impede and delay the exchange of the transformer.

SUMMARY

In an embodiment, the present invention provides a device support assembly for an electrical device, in particular a transformer or a power transformer, comprising: a plurality of retaining units arranged on the device itself; and a support arrangement which has a plurality of load stabilizers, wherein the electrical device is configured to be set down on the load stabilizers by the retaining units in an end position and/or is configured to rest and be arranged between the load stabilizers, at least in portions, after being set down.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
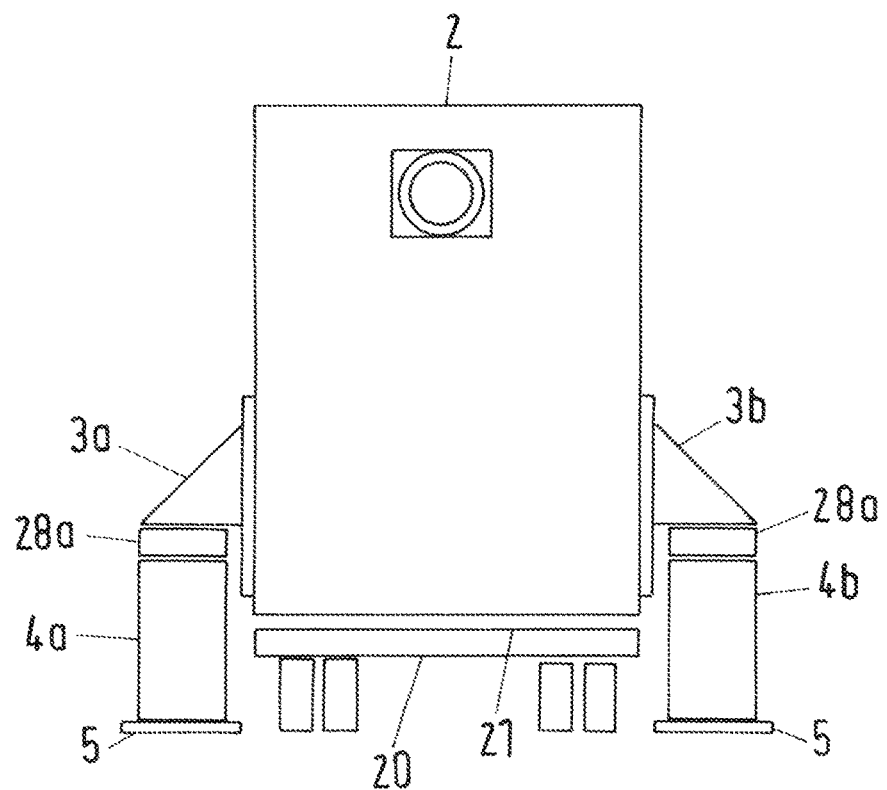
FIG. 1 shows an example of a device support assembly, together with a transformer and low bed trailer.

The device support assembly according to the invention comprises retaining units arranged on the device itself, and a support arrangement having a plurality of load stabilizers, in particular four columnar support feet, the electrical device in question, in particular a transformer or power transformer, being set down on the load stabilizers by the retaining units in the end position and/or resting and being arranged between the load stabilizers, at least in portions, after being set down.

In this case, the installation and unloading process can advantageously be simplified in that the use of a mobile heavy lift crane can be dispensed with by using a semi-low loader trailer, comprising a platform or load bed which has a hydraulic lifting function or hydraulic height adjustor, by the device in question, in particular the transformer, being brought to the installation location by the trailer, the load bed first being raised to such an extent that the retaining units can be moved freely over the load stabilizers and can be positioned thereover, and after the retaining units have been aligned, in particular centrally, over the load stabilizers, the load bed being lowered such that the retaining units, and therefore the device, rest on the load stabilizers in the end position. The load bed is then lowered further until the trailer and/or the load bed can be moved with clearance under and away from the transformer.

The load stabilizers are advantageously arranged on a foundation, in particular a concrete foundation, which bears the load of the electrical device.

In a further embodiment, at least one attenuating element or vibration damper and/or an anti-vibration underlay is provided between the load stabilizers and the foundation and/or between the load stabilizers and the retaining units in each case.

In a further embodiment, the device support assembly comprises at least four retaining units, which are arranged on the device and are in particular equally distributed or symmetrically fastened to the device in question by means of welding, a riveted joint, bolts and/or a screw connection and/or a catch, in particular so as to be removeable in a damage-free manner.

The retaining units can also advantageously be arranged on the device so as to be height-adjustable and/or vertically adjustable, for example along a guide or guideway.

The guide can also comprise holes through which bolts and/or screws are intended to pass for fastening the retaining units in question.

Furthermore, the load stabilizers can be designed so as to be height-adjustable and comprise multiple parts, i.e. at least two mutually engaging load stabilizer components which can be rotated relative to one another and which are provided with a screw thread.

Advantageously, an anti-rotation device can also be provided which prevents undesired rotation of the two components and undesired height adjustment and secures and locks the two components relative to one another.

A corresponding installation method for an electrical device by means of the aforementioned device support assembly, and the use of load stabilizers for installing an electrical device, in particular a transformer or power transformer, is also claimed.

The invention is described in more detail in the following along with advantageous configurations and developments, with reference to several drawings and embodiments.

FIG. 1 shows an example of a device support assembly for a transformer 2, comprising four retaining units 3a, b, c, d arranged on the device itself (in this case the transformer), and a support arrangement having four load stabilizers 4a, b, c, d, in particular four columnar support feet or rest pillars, also known as elephant feet. The load stabilizers 4a, b, c, d, shown by way of example here as rest pillars, are made of steel and have a cylindrical shape having a diameter of approximately 1 m and a height of approximately 1.3 m. Each of the rest pillars shown by way of example here is designed for a load of up to approximately 35 t. However, the dimensions ultimately depend on the load of the device in question (in this case the transformer) which is to be supported. Accordingly, rest pillars having a greater load capacity can also be designed.

A relatively large steel plate 5 having a thickness of a few centimeters can be placed underneath the load stabilizers or rest pillars in question in order for the load of the device to be received to be better distributed on the base.

In the end position, the electrical device in question, in particular the transformer, is set down in the end position on the load stabilizers 4a, b, c, d by the retaining units 3a, b, c, d, and/or rests between the load stabilizers 4a, b, c, d, at least in portions, and/or is positioned therebetween, after being set down.

Figure 3:
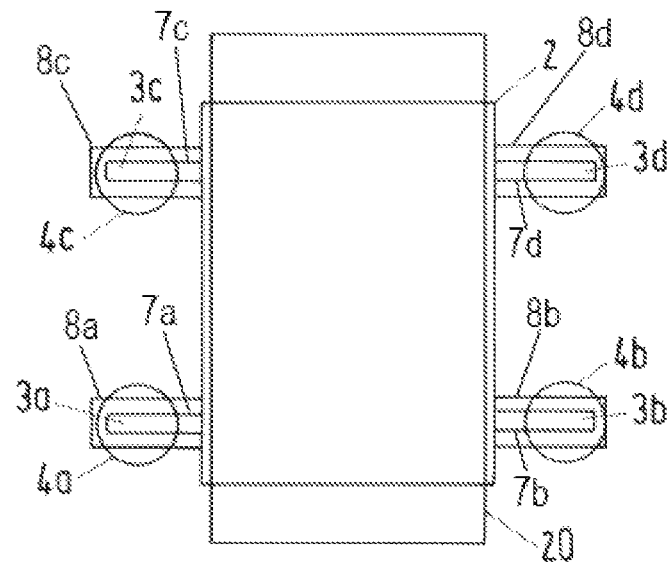
FIG. 3 is a side view of an example of a device support assembly together with a transformer that has been set down.

In this case, the installation and unloading process is simplified in that the use of a mobile heavy lift crane can be dispensed with by using a semi-low loader trailer 20, as shown in FIGS. 1 and 3, comprising a platform or load bed 21 which has a hydraulic lifting function or hydraulic height adjustor, by the transformer 2 being set down, by the base or underside thereof, on the load bed of the trailer 20 and being brought to the installation location by the trailer 20. The load bed 21 first rises or is raised to such an extent that the retaining units 3a, b, c, d can be moved freely over the load stabilizers 4a, b, c, d and can be positioned thereover, and after the retaining units 3a, b, c, d have been aligned, in particular centrally, over the load stabilizers 4a, b, c, d (see also FIG. 3), the load bed 21 is lowered such that the retaining units, and therefore the transformer 2, rest on the load stabilizers 4a, b, c, d in the end position. The load bed 21 is then lowered further until the trailer 20 and/or the load bed 21 can be moved with clearance under and away from the transformer 2.

The load stabilizers 4a, b, c, d are arranged on a foundation, in particular a concrete foundation, which bears the load of the transformer 2.

As shown in FIG. 1, at least one attenuating element or vibration damper and/or an anti-vibration underlay 28a, b is also provided between the load stabilizers 4a, b, c, d and the foundation 26 and/or between the load stabilizers 4a, b, c, d and the retaining units 3a, b, c, d in each case.

As shown in FIG. 3, the device support assembly comprises at least four retaining units 3a, b, c, d, which are arranged on the device and are in particular equally distributed or symmetrically fastened to the device in question by means of bolts and/or a screw connection so as to be removeable.

Figure 2:
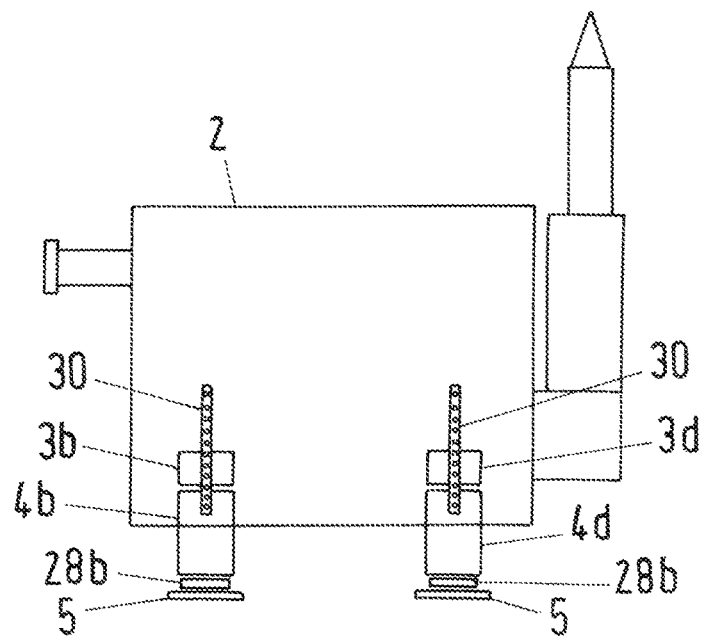
FIG. 2 shows an example of a device support assembly together with a transformer that has been set down.

As shown in FIG. 2, the retaining units 3a, b, c, d are arranged on the transformer 2 so as to be height-adjustable and/or vertically adjustable along a guide 30 or a guideway.

The guide can comprise holes arranged in the vertical longitudinal direction through which bolts and/or screws are intended to pass for fastening the retaining units in question.

Figure 4:
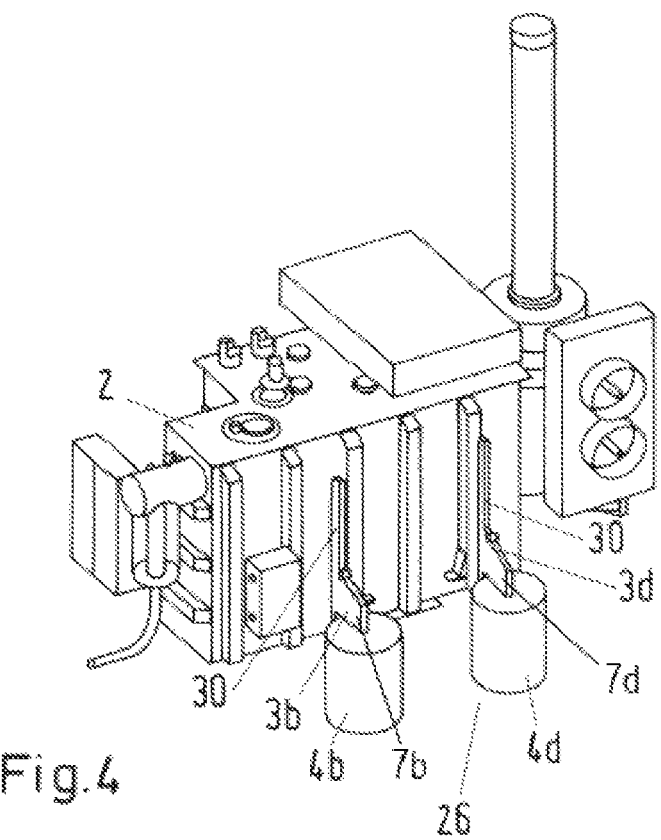
FIG. 4 is a plan view of an example of a device support assembly together with a transformer that has been set down.
Figure 5:
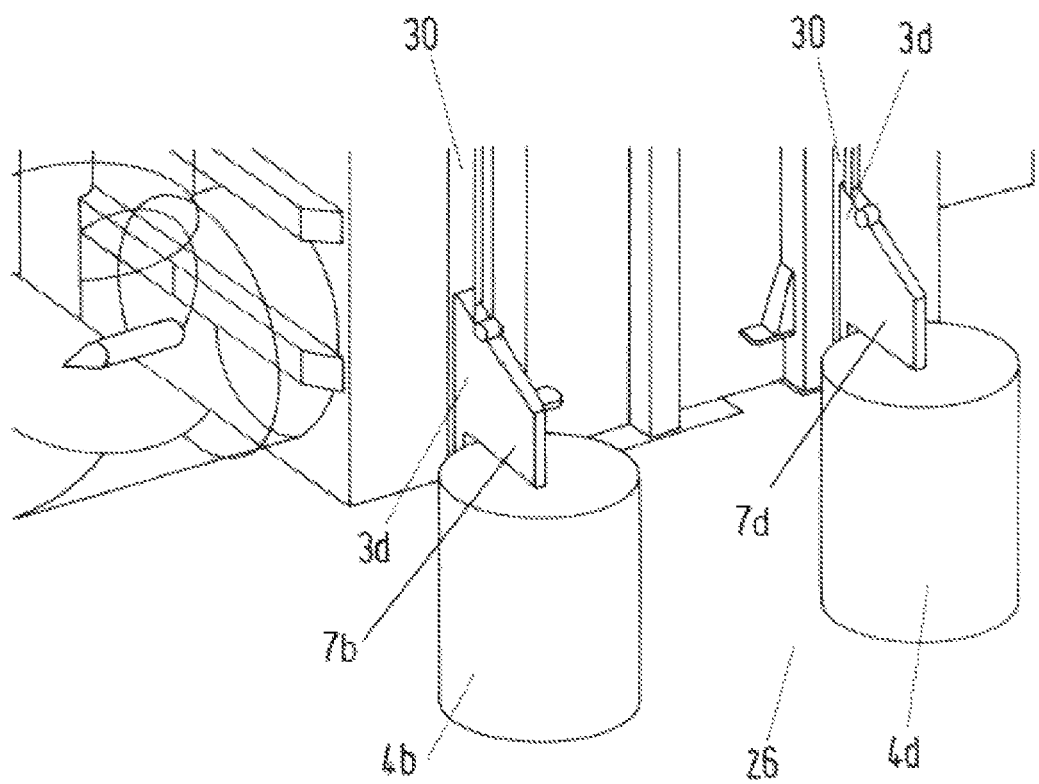
FIG. 5 shows an example of a device support assembly comprising retaining units and load stabilizers.

The load stabilizers 4 a, b, c, d are screwed to the retaining units 3 a, b, c, d, shown in FIGS. 4 and 5 in order to ensure that said retaining units 3 a, b, c, d do not shift out of place or change their position during operation because of the vibrations of the transformer 2. The aforementioned screw connection is not explicitly shown in the drawings.

The retaining units 3 a, b, c, d, which are designed as lifting plates, comprise parallel, vertical steel plates 7 a, b, c, d, which are connected, in particular screwed, to horizontally aligned steel plates 8 a, b, c, d, which are shown in FIG. 3, and which in turn rest on the load stabilizers 4 a, b, c, d or rest pillars in the end position.

The retaining units 3a, b, c, d or lifting plates in question can in turn be screwed, to the transformer 2 on a perforated strip 6, the perforated strip 6 being a resilient height adjustor of the system.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device support assembly, comprising:
an electrical device;
a plurality of retaining units, each retaining unit comprising:
a vertical plate coupled to the electrical device; and
a horizontal plate coupled to the vertical plate, arranged perpendicular to the vertical plate, and height adjustable with respect to the electrical device; and
a support arrangement comprising a plurality of load stabilizers,
the plurality of retaining units configured to support the electrical device on the plurality of load stabilizers such that the electrical device is configured to at least partially rest on and be arranged between the plurality of load stabilizers, and
the horizontal plates of the retaining units configured to rest on the load stabilizers.

2. The device support assembly according to claim 1, wherein the plurality of load stabilizers are arranged on a foundation, which bears a load of the electrical device.

3. The device support assembly according to claim 2, further comprising at least one of an attenuating element, a vibration damper, an anti-vibration underlay arranged between at least one of the plurality of load stabilizers and the foundation, or between at least one of the plurality of load stabilizers and at least one of the plurality of retaining units.

4. The device support assembly according to claim 2, wherein the foundation comprises a concrete foundation.

5. The device support assembly according to claim 1, wherein the plurality of retaining units comprises at least four retaining units which are arranged on the electrical device.

6. The device support assembly according to claim 5, wherein the at least four retaining units removably fastened to the electrical device.

7. The device support assembly according to claim 1, wherein the vertical plate of each retaining unit comprises two parallel, vertical steel plates, and wherein the horizontal plate of each retaining unit comprises a horizontally aligned steel plate.

8. The device support assembly according to claim 1, wherein the plurality of load stabilizers comprises four columnar support feet.

9. The device support assembly according to claim 1, wherein the electrical device comprises a transformer or a power transformer.

10. The device support assembly according to claim 1, wherein the vertical plates of the plurality of retaining units are parallel to each other.

11. The device support assembly according to claim 1, wherein each retaining unit is vertically adjustable with respect to the electrical device.

12. A method for installing an electrical device using a device support assembly and a trailer, the method comprising:
bringing the electrical device to an installation location using the trailer, the load bed being raised on the trailer such that a plurality of retaining units are freely movable over a plurality of load stabilizers of a device support assembly at an installation location, each retaining unit comprising a vertical plate coupled to the electrical device and a horizontal plate coupled to the vertical plate and arranged perpendicular to the vertical plate;
moving the electrical device to the installation location to position and align the plurality retaining units over the plurality of load stabilizers;
adjusting a height of at least one retaining unit of the plurality of retaining units with respect to the electrical device;
lowering the load bed such that horizontal plates of the plurality of retaining units and the electrical device rest on the plurality of load stabilizers in the end position of the plurality of retaining units; and
further lowering the load bed until the load bed is horizontally movable with clearance under and away from the electrical device.

13. The method of claim 12, wherein the electrical device comprises a transformer or a power transformer.

14. The method of claim 12, wherein each of the plurality load stabilizers comprises a rest pillar.

15. The method of claim 12, further comprising:
before lowering the load bed, adjusting a height of the horizontal plate of at least one of the plurality or retaining units.

* * * * *